(12) United States Patent
Cheng

(10) Patent No.: US 11,671,789 B2
(45) Date of Patent: Jun. 6, 2023

(54) AUTOMATIC INTERPRETATION METHOD, TERMINAL, SERVER, SYSTEM, AND ELECTRONIC DEVICE

(71) Applicant: BOE Technology Group Co., Ltd., Beijing (CN)

(72) Inventor: Xinyi Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 481 days.

(21) Appl. No.: 16/639,796

(22) PCT Filed: Aug. 14, 2019

(86) PCT No.: PCT/CN2019/100588
§ 371 (c)(1),
(2) Date: Feb. 18, 2020

(87) PCT Pub. No.: WO2020/078090
PCT Pub. Date: Apr. 23, 2020

(65) Prior Publication Data
US 2021/0099833 A1 Apr. 1, 2021

(30) Foreign Application Priority Data
Oct. 18, 2018 (CN) .......................... 201811212707.3

(51) Int. Cl.
*H04W 4/024* (2018.01)
*H04W 76/11* (2018.01)
(Continued)

(52) U.S. Cl.
CPC .......... *H04W 4/024* (2018.02); *H04L 67/146* (2013.01); *H04L 67/52* (2022.05); *H04L 67/55* (2022.05); *H04W 4/06* (2013.01); *H04W 76/11* (2018.02)

(58) Field of Classification Search
CPC ....... H04W 4/024; H04W 4/06; H04W 76/11; H04L 67/146; H04L 67/52; H04L 67/55; H04L 67/12; H04L 67/1095
See application file for complete search history.

(56) References Cited

U.S. PATENT DOCUMENTS

| 7,720,044 B1 | 5/2010 | Rainisto |
| 10,624,031 B2 | 4/2020 | Li et al. |

(Continued)

FOREIGN PATENT DOCUMENTS

| CN | 101339725 A | 1/2009 |
| CN | 102056078 A | 5/2011 |

(Continued)

OTHER PUBLICATIONS

First Office Action, including Search Report, for Chinese Patent Application No. 201811212707.3, dated Mar. 16, 2020, 33 pages.

*Primary Examiner* — Joshua L Schwartz
(74) *Attorney, Agent, or Firm* — Westman, Champlin & Koehler, P.A.

(57) ABSTRACT

The present disclosure discloses an automatic explanation method, comprising: establishing communication with a presentation terminal and acquiring a terminal identifier of the presentation terminal; uploading the terminal identifier to a server and receiving returned explanation content information comprising an explanation content which matches a presentation content of the presentation terminal; and outputting the explanation content. The present disclosure further discloses an explanation terminal, a server, a presentation terminal, a system, an electronic device, and a storage medium.

14 Claims, 4 Drawing Sheets

(51) Int. Cl.
*H04L 67/146* (2022.01)
*H04W 4/06* (2009.01)
*H04L 67/52* (2022.01)
*H04L 67/55* (2022.01)

(56) References Cited

U.S. PATENT DOCUMENTS

| | | | |
|---|---|---|---|
| 2002/0077896 | A1 | 6/2002 | Liu et al. |
| 2004/0078813 | A1* | 4/2004 | Kobuya ............... G09B 29/007 |
| | | | 348/E5.103 |
| 2007/0006098 | A1* | 1/2007 | Krumm .................. H04W 4/18 |
| | | | 715/825 |
| 2008/0051031 | A1 | 2/2008 | Itoh et al. |
| 2009/0005080 | A1* | 1/2009 | Forstall ................ H04W 4/023 |
| | | | 455/456.3 |
| 2016/0095064 | A1 | 3/2016 | Li et al. |
| 2021/0084577 | A1* | 3/2021 | Wakabayashi ........ H04W 48/18 |

FOREIGN PATENT DOCUMENTS

| | | | |
|---|---|---|---|
| CN | 102237024 | A | 11/2011 |
| CN | 102355494 | A | 2/2012 |
| CN | 102693503 | A | 9/2012 |
| CN | 103377602 | A | 10/2013 |
| CN | 104410957 | A | 3/2015 |
| CN | 204334960 | U | 5/2015 |
| CN | 105245589 | A | 1/2016 |
| CN | 105451184 | A | 3/2016 |
| CN | 105550722 | A | 5/2016 |
| CN | 105681368 | A | 6/2016 |
| CN | 106454718 | A | 2/2017 |
| CN | 106921692 | A | 7/2017 |
| CN | 109309722 | A | 2/2019 |

\* cited by examiner

AUTOMATIC INTERPRETATION METHOD, TERMINAL, SERVER, SYSTEM, AND ELECTRONIC DEVICE

CROSS-REFERENCE TO RELATED APPLICATION(S)

This application is a U.S. national phase application of the PCT application (PCT/CN2019/100588) filed on Aug. 14, 2019, entitled "AUTOMATIC EXPLANATION METHOD, TERMINAL, SERVER, SYSTEM, AND ELECTRONIC DEVICE", which claims priority to the Chinese Patent Application No. 201811212707.3, filed on Oct. 18, 2018, entitled "AUTOMATIC EXPLANATION METHOD, TERMINAL, SERVER, SYSTEM, AND ELECTRONIC DEVICE", both of which are incorporated herein by reference in their entireties.

TECHNICAL FIELD

The present disclosure relates to the field of data processing technology, and particularly to an automatic explanation method, terminal, server, system, and electronic device.

BACKGROUND

Currently, various public places are usually provided with various presentation boards etc. for presenting various contents, for example, advertisements, information related to the public places, etc. In particular, there are often paintings, ruins etc. in places for visitors such as galleries, monuments etc.

For the above presentation contents, audio guides are usually provided for visitors to acquire detailed explanation contents, thereby enriching visit contents. However, the audio guides in the related technology usually may only acquire corresponding explanation contents by being input with numbers prompted at corresponding locations, and these explanation contents are usually stored in the audio guides and are predetermined, and may not change at any time as the explanation contents.

SUMMARY

Based on the above purposes, some embodiments of the present disclosure provide an automatic explanation method implemented by an explanation terminal, comprising:

establishing communication with a presentation terminal and acquiring a terminal identifier of the presentation terminal;

uploading the terminal identifier to a server and receiving returned explanation content information comprising an explanation content which matches a presentation content of the presentation terminal; and outputting the explanation content.

Some other embodiments of the present disclosure provide an automatic explanation method implemented by a server, comprising:

receiving a terminal identifier of a presentation terminal;

determining a presentation content of the presentation terminal corresponding to the terminal identifier;

determining explanation content information which matches the presentation content; and returning the explanation content information.

Still some other embodiments of the present disclosure provide an automatic explanation method implemented by a presentation terminal, comprising:

transmitting a broadcast signal according to a first preset period;

receiving a matching request from an explanation terminal; and establishing communication with the explanation terminal and transmitting a terminal identifier to the explanation terminal.

Some embodiments of the present disclosure provide an explanation terminal, comprising:

a first transceiving module configured to establish communication with a presentation terminal, acquire a terminal identifier of the presentation terminal, upload the terminal identifier to a server and receive returned explanation content information comprising an explanation content which matches a presentation content of the presentation terminal; and an output module configured to output the explanation content.

Some other embodiments of the present disclosure provide a server, comprising:

a second transceiving module configured to receive a terminal identifier of a presentation terminal, and return explanation content information; and a processing module configured to determine a presentation content of the presentation terminal corresponding to the terminal identifier, retrieve explanation content information comprising an explanation content which matches the presentation content of the presentation terminal.

Still some other embodiments of the present disclosure provide a presentation terminal, comprising:

a third transceiving module configured to transmit a broadcast signal according to a first preset period, receive a matching request from an explanation terminal, establish communication with the explanation terminal and transmit a terminal identifier to the explanation terminal.

Still some other embodiments of the present disclosure provide an automatic explanation system, comprising the explanation terminal, the server, and the presentation terminal.

Still some other embodiments of the present disclosure provide an explanation terminal, comprising:

a first communicator;

a second communicator;

at least one processor communicatively connected to the first communicator and the second communicator; and a memory communicatively connected to the at least one processor, wherein the memory has stored thereon instructions executable by the at least one processor, wherein the instructions, when executed by the at least one processor, enable the at least one processor to:

establish communication with a presentation terminal and acquire a terminal identifier of the presentation terminal through the first communicator;

upload the terminal identifier to a server and receive returned explanation content information comprising an explanation content which matches a presentation content of the presentation terminal through the second communicator; and output the explanation content.

Still some other embodiments of the present disclosure provide a server, comprising:

a third communicator;

at least one processor communicatively connected to the third communicator; and a memory communicatively connected to the at least one processor, wherein the memory has stored thereon instructions executable by the at least one processor, wherein the instructions, when executed by the at least one processor, enable the at least one processor to:

receive a terminal identifier of a presentation terminal through the third communicator;

determine a presentation content of the presentation terminal corresponding to the terminal identifier;

determine explanation content information which matches the presentation content; and return the explanation content information.

Still some other embodiments of the present disclosure provide a presentation terminal, comprising:

a fourth communicator;

at least one processor communicatively connected to the fourth communicator; and a memory communicatively connected to the at least one processor, wherein the memory has stored thereon instructions executable by the at least one processor, wherein the instructions, when executed by the at least one processor, enable the at least one processor to:

transmit a broadcast signal according to a first preset period through the fourth communicator;

receive a matching request from an explanation terminal through the fourth communicator; and establish communication with the explanation terminal and transmit a terminal identifier to the explanation terminal through the fourth communicator.

Still some other embodiments of the present disclosure provide a computer readable storage medium having stored thereon a computer program, which when executed by a processor, implements the steps of any of the methods described above.

BRIEF DESCRIPTION OF THE ACCOMPANYING DRAWINGS

In order to more clearly illustrate the technical solutions according to the embodiments of the present disclosure, the accompanying drawings of the embodiments will be briefly introduced below. Obviously, the accompanying drawings in the following description only relate to some embodiments of the present disclosure, rather than limiting the present disclosure.

DETAILED DESCRIPTION

In order to make the purposes, technical solutions, and advantages of the embodiments of the present disclosure more clear, the technical solutions according to the embodiments of the present disclosure will be described clearly and completely below in combination with the accompanying drawings of the embodiments of the present disclosure. Obviously, the described embodiments are a part of the embodiments of the present disclosure, but not all the embodiments. All other embodiments obtained by those of ordinary skill in the art based on the described embodiments of the present disclosure without any creative work shall fall within the protection scope of the present disclosure.

Unless defined otherwise, the technical or scientific terms used in the present disclosure shall have the ordinary meanings understood by those of ordinary skill in the art to which the present disclosure belongs. The terms "first", "second", etc. used in the present disclosure do not indicate any order, quantity, or importance, but are only used to distinguish different components. Similarly, "a", "an", or "the" etc. do not indicate limitations on quantity, but rather indicate presence of at least one. The word such as "comprising" or "including" etc. means that an element or item preceding the word encompasses elements or items which appear after the word and their equivalents, but does not exclude other elements or items. The word such as "connected" or "connecting" etc. is not limited to physical or mechanical connections but may comprise electrical connections, regardless of direct connections or indirect connections. "Up", "down", "left", "right", etc. are only used to indicate a relative position relationship, and after an absolute position of an object described changes, the relative position relationship may also change accordingly.

Figure 1:
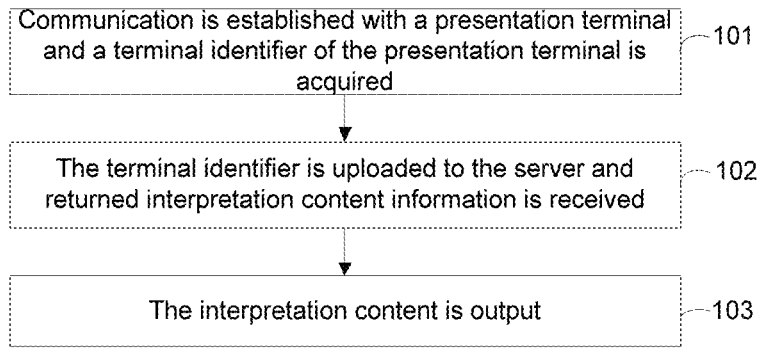
FIG. 1 is a schematic flowchart of an embodiment of an automatic explanation method according to the present disclosure.

Some embodiments of the present disclosure propose an automatic explanation method, which may acquire a corresponding explanation content according to a presentation content of a presentation terminal. As shown in FIG. 1, illustrated is a schematic flowchart of an embodiment of an automatic explanation method according to the present disclosure.

In some embodiments, the automatic explanation method may be applied to an explanation terminal and comprises the following steps.

In step 101, communication is established with a presentation terminal and a terminal identifier of the presentation terminal is acquired.

Here, the communication may be established and the terminal identifier of the presentation terminal may be acquired by means of wireless communication. The wireless communication may be, for example, Bluetooth, Radio Frequency Identification (RFID), Near Field Communication (NFC), etc.

In some embodiments, the presentation terminal may be a terminal for presenting content, which is provided in any public place (for example, various commercial supermarkets, hospitals etc.) or visiting place (for example, galleries, former residences of celebrities, etc.), the presentation content may be advertisements, paintings, or information related to the place, for example, an introduction, presentation of ruins etc., and all the contents which may be presented may be contents which may be presented by the presentation terminal.

In some embodiments, the presentation content of the presentation terminal may be changed, and the change may be physical change (for example, change of paintings) or informational change (for example, change of information contained in the presentation content). When the presentation content is informational content, the presentation terminal may be an electronic presentation board, an electronic screen, etc., and the content may be changed by changing display information. After the presentation content of the presentation terminal is changed, the presentation terminal needs to upload the updated presentation content together with its terminal identifier to a server for the server to update its related information which is locally stored.

In step 102, the terminal identifier is uploaded to the server and returned explanation content information is received, wherein the explanation content information comprises explanation content which matches the presentation content of the presentation terminal.

In some embodiments, the terminal identifier refers to identification information which may be used to uniquely determine the presentation terminal (for example, a unique code of the presentation terminal which is set before leaving the factory). After the server receives the terminal identifier, it may locally find explanation content information corresponding to the presentation content of the presentation terminal, and thus returns the explanation content information.

In some embodiments, the explanation content may be information which matches the presentation content and explains the presentation content in more detail, and such information may be a text content, a voice content, an image content, a video content, etc. For example, when the presentation content is a painting, the explanation content may be an introduction of an artist, an introduction of a background in which the artist creates the painting, etc.

In some embodiments, when the presentation content is an advertisement, the explanation content information may further comprise information such as a product corresponding to the advertisement, a merchant's coupon, a discount card, etc.

In step 103, the explanation content is output.

In some embodiments, the explanation content may be output by means of voice playback, text or picture display etc., or by means of a combination of voice and display, which is not specifically limited, and may be set as needed.

It may be seen from the above embodiments that with the automatic explanation method according to the embodiments of the present disclosure, the terminal identifier of the presentation terminal with which the communication has been established is automatically acquired and uploaded to the server, and thereby the explanation content is acquired from the server, so that the explanation terminal may automatically output the explanation content without users' any instruction operation on the explanation terminal, to achieve the effect of automatically explaining, to visitors, the presentation content of the presentation terminal where the visitors are currently located.

In some embodiments, establishing communication with the presentation terminal may specifically comprise the following steps.

A broadcast signal transmitted by the presentation terminal is received. Here, the broadcast signal may be a broadcast signal which may be transmitted by a signal source in any wireless communication manner. In this embodiment, description is made by taking Bluetooth as an example. When the explanation terminal enters a Bluetooth broadcast coverage (the coverage depends on transmission power of a transmitter of a Bluetooth module, a receiving sensitivity of a receiver, and a loss of a communication link), a transceiving module in the explanation terminal receives a signal broadcast by the transmitter of the Bluetooth module, for example, reads a Bluetooth address, and finds a matched presentation terminal through the address.

It is determined whether signal strength of the broadcast signal satisfies a first strength threshold. In some embodiments, the first strength threshold may be preset, has a value which may enable communication established when the strength threshold is satisfied to be smooth, and is not specifically limited.

If the signal strength of the broadcast signal satisfies the first strength threshold, communication is established with the presentation terminal.

In this way, communication is established with the presentation terminal which satisfies the first strength threshold to ensure the quality of explanation.

As another alternative embodiment, establishing communication with the presentation terminal may specifically comprise the following steps.

Broadcast signals transmitted by presentation terminals are received. Here, each of the broadcast signals may be a broadcast signal which may be transmitted by a signal source in any wireless communication manner. In this embodiment, description is made by taking Bluetooth as an example.

A number of the received broadcast signals is determined. The number of the broadcast signals is determined according to the presentation terminals which transmit the broadcast signals, and specifically, the broadcast signals comprise identification information capable of distinguishing the different broadcast signals from each other, so that the broadcast signals may be distinguished.

If there is one broadcast signal, communication is established with the presentation terminal corresponding to the broadcast signal.

If there are two or more broadcast signals, first two broadcast signals in a descending signal strength order are selected and a difference between the signal strength of the two broadcast signals is calculated.

If the difference is greater than or equal to a difference threshold, it means that strength of a broadcast signal having the highest signal strength is much greater than that of a broadcast signal having the second highest strength (the difference between the strength of the two broadcast signals is at least as large as the difference threshold), and then communication is established with the presentation terminal having the highest signal strength, which is sufficient to ensure the signal strength.

If the difference is less than the difference threshold, it is determined whether the signal strength of the broadcast signal having the highest strength satisfies a second strength threshold. In some embodiments, the second strength threshold may be preset, has a value which may enable communication established when the strength threshold is satisfied to be smooth, and is not specifically limited. However, in some cases, the second strength threshold may be the same as the first strength threshold in the above embodiments.

If the signal strength of the broadcast signal having the highest strength satisfies the second strength threshold, communication is established with the presentation terminal.

If the signal strength of the broadcast signal having the highest strength does not satisfy the second strength threshold, no communication is established with the presentation terminal until the condition is satisfied.

It should be illustrated that when the explanation terminal receives two or more broadcast signals, first two signals in a descending strength order are selected and a difference between the strength of the two signals is calculated. The comparison of the difference may be used to eliminate unknown influences of environmental factors on the signal propagation process, for example, multipath effects, to ensure that the explanation terminal is currently indeed within a coverage of the highest strength of the broadcast signal of the corresponding presentation terminal. In addition, in a case where the difference does not satisfy the condition, it is determined whether the strength of the broadcast signal is greater than the second strength threshold, so as to avoid a case that the explanation terminal is far away from the broadcast signal having the greatest strength. The specific reason is that the signal attenuation is exponential, and therefore, the longer the distance, the smaller the difference between signal strength attenuations at different distances. Therefore, when the difference does not satisfy the condition, it is likely that the presentation terminal is far away from the explanation terminal, and thus it needs to determine whether the strength of the broadcast signal is strong enough.

It may be seen from the above embodiments that when there is more than one broadcast signal, a presentation terminal corresponding to a broadcast signal having the optimal signal quality is selected for communication, thereby ensuring the quality of explanation.

It should be illustrated that when the broadcast signal does not satisfy the first strength threshold or the second strength threshold and thus communication is not established temporarily with any presentation terminal, the broadcast signal may further be compared with the first strength threshold or the second strength threshold periodically according to a predetermined time interval, until the broadcast signal satisfies the requirements, and then corresponding communication is established.

As an alternative implementation of the present disclosure, after communication is established with the presentation terminal, the following steps may further be included.

The communication is timed.

If duration of the communication exceeds a first duration threshold and the communication is not disconnected, it means that the visitor is standing in front of the presentation terminal with which the communication has been established, and the explanation content is output.

If the duration does not exceed the first duration threshold and the communication is disconnected, it means that the visitor just passed in front of the presentation terminal with which the communication has been established, then the explanation content is not output and the duration is reset.

In this way, the duration of the communication is limited by the first duration threshold, and when the user only passes by the presentation terminal, the explanation content is not output, thereby not affecting the user experience. The first duration threshold may be set as needed. A specific set value may be selected by referring to time during which people usually stay when visiting an object, or by counting time during which each explanation terminal stays in front of each presentation terminal.

In the above timing process, the above step of uploading the terminal identifier to the server and receiving the returned explanation content information comprising the explanation content which matches the presentation content of the presentation terminal may be completed or may not be completed or may even be in progress, which does not influence the determination of whether to finally output the explanation content, is not specifically limited here, and may be adjusted according to practical requirements.

Further, the automatic explanation method may further comprise the following steps.

It is determined whether the duration of the communication exceeds a second duration threshold, which may be generally greater than the above first duration threshold. The second duration threshold may be set as needed. A specific set value may be selected by referring to time during which people usually stay when visiting an object, or by counting time during which each explanation terminal stays in front of each presentation terminal.

If the duration of the communication exceeds the second duration threshold, it means that the visitor stays in front of the corresponding presentation terminal for a too long time. In order to remind the visitor to continue to visit, timeout reminder information is output. In some embodiments, the timeout reminder information may be implemented by means of voice prompt or by displaying prompt information in the explanation terminal of the visitor etc.

In this way, the second duration threshold is set to limit the duration of the communication, and when a user stays in front of a certain presentation terminal for a too long time, he/she is reminded to continue to visit, which on the one hand, improves the visiting efficiency of the visitors, and on the other hand, helps dispersing the flow of people in front of the presentation terminal.

As an alternative embodiment of the present disclosure, the automatic explanation method may further comprise the following steps.

Path planning information returned by the server is received.

Navigation content is output according to the path planning information. In some embodiments, the navigation content may be output by means of voice playback, text or picture display, or a combination of voice and display, which is not specifically limited, and may be set as needed.

In this way, the user is directed to visit according to path planning of the explanation terminal by the server, so that the user visits according to his/her path allocated by the server. In some cases, the flow of users may be dispersed in this way to prevent too many users from walking on the same line which causes congestion.

Figure 2:
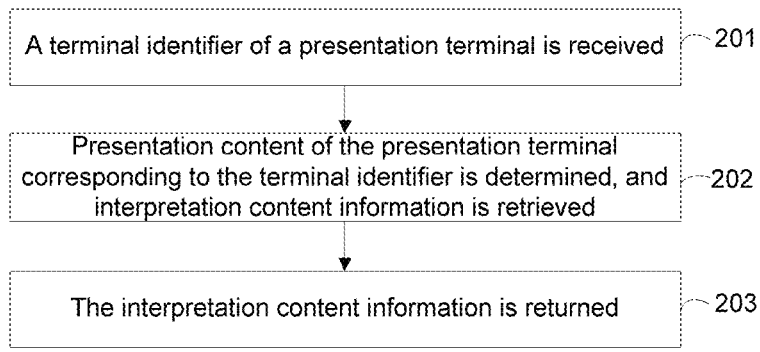
FIG. 2 is a schematic flowchart of another embodiment of an automatic explanation method according to the present disclosure.

Some other embodiments of the present disclosure propose an automatic explanation method, which may feed back a corresponding explanation content according to a presentation content of a presentation terminal. As shown in FIG. 2, illustrated is a schematic flowchart of another embodiment of an automatic explanation method according to the present disclosure.

In some embodiments, the automatic explanation method is applicable to a server and comprises the following steps.

In step 201, a terminal identifier of a presentation terminal is received.

In some embodiments, the presentation terminal may be a terminal for presenting content, which is provided in any public place or visiting place, the presentation content may be advertisements, paintings, or information related to the place, for example, an introduction, presentation of ruins etc., and all the contents which may be presented may be contents which may be presented by the presentation terminal.

In step 202, presentation content of the presentation terminal corresponding to the terminal identifier is determined, and explanation content information is retrieved, wherein the explanation content information comprises explanation content which matches the presentation content of the presentation terminal.

In some embodiments, the terminal identifier refers to identification information which may be used to uniquely determine the presentation terminal. After the server receives the terminal identifier, it may locally find explanation content information corresponding to the presentation content of the presentation terminal, and thus returns the explanation content information.

In some embodiments, the explanation content may be information which matches the presentation content and explains the presentation content in more detail, and such information may be a text content, a voice content, an image content, a video content, etc. For example, when the presentation content is a painting, the explanation content may be an introduction of an artist, an introduction of a background in which the artist creates the painting, etc.

In some embodiments, when the presentation content is an advertisement, the explanation content information may further comprise information such as a product corresponding to the advertisement, a merchant's coupon, a discount card, etc.

In step 203, the explanation content information is returned to the explanation terminal.

It may be seen from the above embodiments that with the automatic explanation method according to the embodiments of the present disclosure, the terminal identifier of the presentation terminal which has established communication with the explanation terminal is received, to retrieve the explanation content information corresponding to the terminal identifier and return the explanation content information to the explanation terminal, so that the explanation terminal may automatically output the explanation content without users' any instruction operation on the explanation terminal, to achieve the effect of automatically explaining, to visitors, the presentation content of the presentation terminal where the visitors are currently located.

In some embodiments, the presentation content of the presentation terminal may be changed, and the change may be physical change (for example, change of paintings) or informational change (for example, change of information contained in the presentation content). When the presentation content is informational content, the presentation terminal may be an electronic presentation board, an electronic screen, etc., and the content may be changed by changing display information. After the presentation content of the presentation terminal is changed, the presentation terminal needs to upload the updated presentation content together with its terminal identifier to a server for the server to update its related information which is locally stored.

Therefore, as an embodiment of the present disclosure, the automatic explanation method may further comprise the following steps.

Presentation content update information of the presentation terminal is received, wherein the presentation content update information comprises the terminal identifier of the presentation terminal and the updated presentation content of the presentation terminal.

The presentation content update information is parsed, and a matching relationship between the terminal identifier and the presentation content of the presentation terminal which is stored locally is updated.

In this way, the presentation content of the presentation terminal is updated, so that the content during the automatic explanation is consistent with the presentation content, and the presentation content of the presentation terminal may not be limited to one specific presentation content, but may be changed as needed, thereby enriching the application field of the presentation terminal.

In some embodiments, the automatic explanation method may further comprise the following steps.

A number of explanation terminals which currently match each presentation terminal is counted. Here, the number of the explanation terminals which currently match each presentation terminal may be determined based on a number of times the server returns corresponding explanation content information corresponding to a presentation terminal within a certain period of time (for example, 10 minutes). Of course, this is only by way of example here, and it is conceivable that there are other ways to count the number, which will not be repeated here.

Map information is retrieved, a path planning algorithm is invoked, and path planning information for each of the explanation terminals is generated based on the number of the explanation terminals which currently match each presentation terminal.

The path planning information is pushed to the respective explanation terminals.

Here, as an alternative implementation, the path planning algorithm may be based on the number of the explanation terminals which currently match each presentation terminal, and a flow of explanation terminals, which have established communication with each of some presentation terminals that matches a number of explanation terminals exceeding a threshold, is dispersed (that is, a flow of visitors who hold the explanation terminals is dispersed). Specifically, a presentation terminal in front of which people need to be subjected to flow dispersion is firstly determined, then several other presentation terminals which are within a reasonable distance from the presentation terminal are determined according to the map information, and then different path planning information is pushed to explanation terminals which have established communication with the presentation terminals for which flow dispersion needs to be performed, so as to direct different people to different presentation terminals to achieve staff dispersion.

In some embodiments, the automatic explanation method may further comprise the following steps.

A number of explanation terminals which currently match each presentation terminal is counted and communication between the respective explanation terminals and each of the presentation terminals is timed. Here, the number of the explanation terminals which currently match each presentation terminal may be determined based on a number of times the server returns corresponding explanation content information corresponding to a presentation terminal within a certain period of time (for example, 10 minutes), and the duration of the communication may be a time difference between a time point when the explanation content information is returned and a current time point. Of course, this is only by way of example here, and it is conceivable that there are other ways to count the number and determine the duration of the communication, which will not be repeated here.

Map information is retrieved, a path planning algorithm is invoked, and path planning information for each of the explanation terminals is generated based on the number of the explanation terminals which currently match each presentation terminal and the duration of the communication between the respective explanation terminals and each of the presentation terminals.

The path planning information is pushed to the respective explanation terminals.

Here, as an alternative implementation, the path planning algorithm may be based on the number of the explanation terminals which currently match each presentation terminal, and a flow of explanation terminals, which have established communication with each of some presentation terminals that matches a number of explanation terminals exceeding a threshold, is dispersed (that is, a flow of visitors who hold the explanation terminals is dispersed). Specifically, a presentation terminal in front of which people need to be subjected to flow dispersion is firstly determined, then several other presentation terminals which are within a reasonable distance from the presentation terminal are determined according to the map information, and then different path planning information is pushed to explanation terminals which have established communication with the presentation terminals for which flow dispersion needs to be performed. However, during the pushing, the path planning information is pushed to an explanation terminal having longer duration of the communication to prompt a user of the explanation terminal to continue to visit, and thereby different people are directed to different presentation terminals based on the duration of the communication, which achieves reasonable staff dispersion, thereby improving the security at crowded places.

Figure 3:
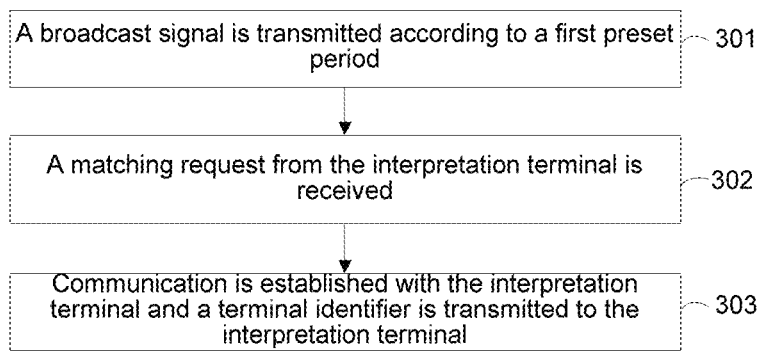
FIG. 3 is a schematic flowchart of yet another embodiment of an automatic explanation method according to the present disclosure.

Still some other embodiments of the present disclosure propose an automatic explanation method, which may help an explanation terminal to acquire a corresponding explanation content according to a presentation content of a presentation terminal. As shown in FIG. 3, illustrated is a schematic flowchart of still another embodiment of an automatic explanation method according to the present disclosure.

In some embodiments, the automatic explanation method is applicable to a presentation terminal and comprises the following steps.

In step 301, a broadcast signal is transmitted according to a first preset period. In some embodiments, the first preset period is a default broadcast period when a device (for example, a Bluetooth module) which transmits a broadcast signal transmits the broadcast signal. Alternatively, the first preset period may also be adjusted as needed, has a specific value which may be set as needed, and is not limited here.

In step 302, a matching request from the explanation terminal is received.

In step 303, communication is established with the explanation terminal and a terminal identifier is transmitted to the explanation terminal. In some embodiments, the terminal identifier may comprise a unique address of the Bluetooth module in addition to a unique code of the presentation terminal.

In some embodiments, the terminal identifier refers to identification information which may be used to uniquely determine the presentation terminal. After the server receives the terminal identifier, it may locally find explanation content information corresponding to the presentation content of the presentation terminal, and thus returns the explanation content information.

It may be seen from the above embodiments that with the automatic explanation method according to the embodiments of the present disclosure, the broadcast signal is transmitted according to the first preset period, the matching request from the explanation terminal is received, and communication is established with the explanation terminal, and then the terminal identifier is transmitted to the explanation terminal, so that the explanation terminal may automatically acquire the explanation content information corresponding to the presentation content of the presentation terminal from the server according to the terminal identifier, so as to realize automatic explanation.

As an embodiment of the present disclosure, the automatic explanation method may further comprise the following steps.

The presentation content is updated according to a second preset period, or an instruction to update the presentation content is received and the presentation content is updated. Here, updating the presentation content according to the second preset period may comprise presetting the second preset period and presentation content to be updated when each period comes, and then updating the presentation content periodically; and receiving the instruction to update the presentation content may comprise receiving the instruction to update the presentation content which is transmitted from an external device to the presentation terminal, wherein the instruction to update the presentation content comprises the updated presentation content, or the instruction to update the presentation content comprises an acquisition path for acquiring the updated presentation content, and the presentation terminal may acquire the corresponding presentation content according to the acquisition path and present the presentation content.

The presentation content update information is transmitted to the server, wherein the presentation content update information comprises the terminal identifier of the presentation terminal and the updated presentation content of the presentation terminal. In some embodiments, the step of transmitting the presentation content update information to the server may be implemented by means of wired or wireless transmission (which may specifically be Narrow Band Internet of Things (NB-IoT), Wireless Fidelity (WiFi), 4G wireless, etc.), and is not limited here.

With the above embodiments, the presentation content of the presentation terminal may be updated as needed, and the updated content is synchronized to the server, so that after communication between the explanation terminal and the presentation terminal is established, the corresponding explanation content may be automatically acquired from the server according to the terminal identifier of the presentation terminal, which may also achieve accurate automatic explanation in a case of unfixed presentation content of the presentation terminal.

Figure 4:
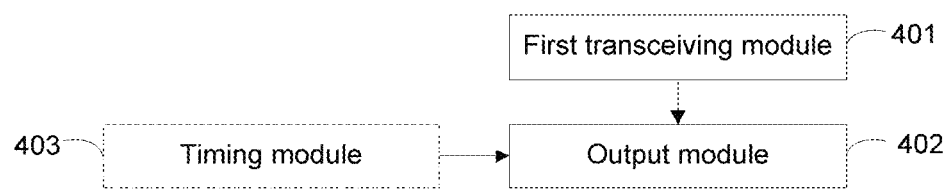
FIG. 4 is a schematic structural diagram of an embodiment of an explanation terminal according to the present disclosure.

Some embodiments of the present disclosure propose an explanation terminal, which may acquire a corresponding explanation content according to a presentation content of a presentation terminal. As shown in FIG. 4, illustrated is a schematic structural diagram of an embodiment of an explanation terminal according to the present disclosure.

The explanation terminal comprises:

a first transceiving module 401 configured to establish communication with a presentation terminal and acquire a terminal identifier of the presentation terminal;

and upload the terminal identifier to the server and receive returned explanation content information, wherein the explanation content information comprises explanation content which matches the presentation content of the presentation terminal; and an output module 402 configured to output the explanation content.

In some embodiments, the explanation terminal may be an audio guide provided in a visiting place, or may be a user's mobile terminal such as a mobile phone etc. When the explanation terminal is a mobile terminal carried by the user himself/herself, program invoking of an automatic explanation method corresponding to the explanation terminal may be implemented by downloading an APP or using an in-app program.

It may be seen from the above embodiments that with the explanation terminal according to the embodiments of the present disclosure, when the explanation terminal enters an explanation region of the presentation terminal, the terminal identifier of the presentation terminal with which the communication has been established is automatically acquired and uploaded to the server, and thereby the explanation content is acquired from the server, so that the explanation terminal may automatically output the explanation content without users' any instruction operation on the explanation terminal, to achieve the effect of automatically explaining, to visitors, the presentation content of the presentation terminal where the visitors are currently located.

In some embodiments, the first transceiving module 401 is further configured to:

receive a broadcast signal transmitted by the presentation terminal;

determine whether signal strength of the broadcast signal satisfies a first strength threshold; and establish communication with the presentation terminal if the signal strength of the broadcast signal satisfies the first strength threshold.

In some embodiments, the first transceiving module 401 is further configured to:

receive broadcast signals transmitted by presentation terminals;

determine a number of the received broadcast signals;

establish communication with a corresponding presentation terminal if there is one broadcast signal;

select first two broadcast signals in a descending signal strength order and calculate a difference between the signal strength of the two broadcast signals if there are two or more broadcast signals;

establish communication with the presentation terminal having the highest signal strength if the difference is greater than or equal to a difference threshold;

determine whether the signal strength of the broadcast signal having the highest strength satisfies a second strength threshold if the difference is less than the difference threshold; and establish communication with the presentation terminal if the signal strength of the broadcast signal having the highest strength satisfies the second strength threshold.

In some embodiments, the explanation terminal further comprises a timing module 403 configured to time the communication;

output the explanation content if duration of the communication exceeds a first duration threshold and the communication is not disconnected; and not output the explanation content if the duration does not exceed the first duration threshold and the communication is disconnected.

Further, the timing module 403 is further configured to determine whether the duration of the communication exceeds a second duration threshold; and output timeout reminder information if the duration of the communication exceeds the second duration threshold.

In some embodiments, the first transceiving module 401 is further configured to receive path planning information returned by a server; and the output module 402 is further configured to output navigation content according to the path planning information.

Figure 5:
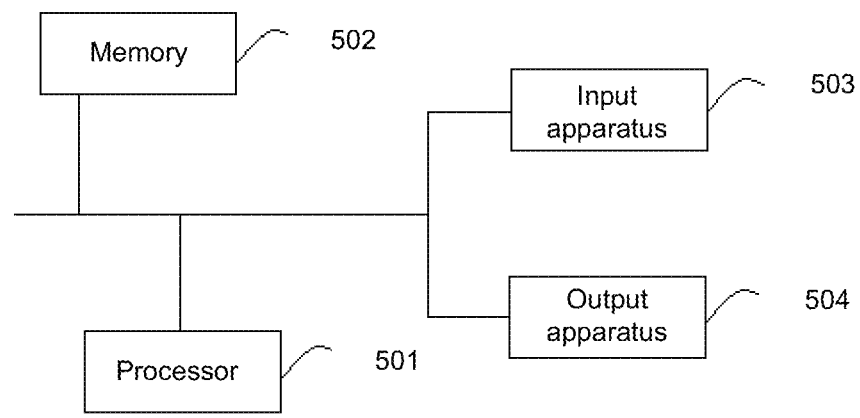
FIG. 5 is a schematic hardware structural diagram of an embodiment of an electronic device which performs the automatic explanation method according to the present disclosure.

Some other embodiments of the present disclosure propose an electronic device which may acquire a corresponding explanation content according to a presentation content of a presentation terminal. As shown in FIG. 5, illustrated is a schematic hardware structural diagram of an embodiment of an electronic device which performs the automatic explanation method according to the present disclosure.

As shown in FIG. 5, the electronic device comprises:

one or more processors 501 and a memory 502, and one processor 501 is taken as an example in FIG. 5.

The electronic device which performs the automatic explanation method may further comprise an input apparatus 503 and an output apparatus 504.

The processor 501, the memory 502, the input apparatus 503, and the output apparatus 504 may be connected through a bus or in other manners, and the connection through the bus is taken as an example in FIG. 5.

The memory 502, as a non-volatile computer-readable storage medium, may be used to store non-volatile software programs, non-volatile computer executable programs, and modules, for example, program instructions/modules (for example, the first transceiving module 401, the output module 402, and the timing module 403 shown in FIG. 4) corresponding to the automatic explanation method in the embodiment. The processor 501 executes various functional applications and data processing of the electronic device, i.e., implementing the automatic explanation method according to the above method embodiment by running the non-volatile software programs, instructions, and modules stored in the memory 502.

The memory 502 may comprise a program storage area and a data storage area, wherein the program storage area may store an operating system and application programs required for at least one function; and the data storage area may store data created according to the use of the explanation terminal etc. In addition, the memory 502 may comprise a high-speed random access memory, and may further comprise a non-volatile memory, for example, at least one magnetic disk storage device, a flash memory device, or other non-volatile solid-state storage devices. In some embodiments, the memory 502 may optionally comprise a memory remotely disposed with respect to the processor 501, and the remote memory may be connected to the electronic device through a network. Examples of the above network comprise, but are not limited to, the Internet, an intranet, a local area network, a mobile communication network, and a combination thereof.

The input apparatus 503 may receive input numeric or character information, and generate a signal input related to user settings and function control of the explanation terminal. The output apparatus 504 may comprise a display device for example a display screen. In addition, the input apparatus 503 and/or the output apparatus 504 may also be, for example, a communicator for communication, such as a wireless communicator for radio frequency communication, Bluetooth communication, WiFi communication, RFID communication, NFC communication, WiMax communication, ZigBee communication, etc. and/or a wired communicator for Ethernet communication, fiber optic communication, xDSL communication, etc. In some embodiments, the audio guide may comprise multiple communicators which support different communication protocols or specifications. For example, the audio guide or the explanation terminal may comprise a first communicator and a second communicator, which support communication with the presentation terminal and the server respectively. In some embodiments, the first communicator may comprise at least one of a Bluetooth communication module, an NFC communication module, a RFID communication module, and a ZigBee communication module. In addition, in some embodiments, the second communicator may comprise at least one of a WiFi communication module, an NB-IoT communication module, and a radio frequency communication module (for example, 2G (for example, GSM, CDMA, etc.), 3G (for example, WCDMA, CDMA2000, TD-SCDAMA, etc.), 4G (for example, LTE, LTE-A, etc.), 5G (for example, NR) communication modules, etc.) The audio guide or the explanation terminal may communicate with the presentation terminal through the first communicator to acquire, for example, a terminal identifier of the presentation terminal, etc., and may communicate with the server through the second communicator to upload, for example, the terminal identifier and/or acquire an explanation content, etc.

The one or more modules are stored in the memory 502, and when executed by the one or more processors 501, perform the automatic explanation method according to any of the method embodiments described above. The technical effect of the embodiment of the apparatus which performs the automatic explanation method is the same as or similar to that of any of the method embodiments described above.

Figure 6:
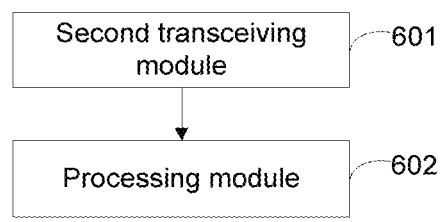
FIG. 6 is a schematic structural diagram of an embodiment of a server according to the present disclosure.

Some other embodiments of the present disclosure propose a server, which may feed back a corresponding explanation content according to a presentation content of a presentation terminal. As shown in FIG. 6, illustrated is a schematic flowchart of an embodiment of a server according to the present disclosure.

The server comprises:

a second transceiving module 601 configured to receive a terminal identifier of a presentation terminal, and return explanation content information;

a processing module 602 configured to determine presentation content of the presentation terminal corresponding to the terminal identifier, and retrieve the explanation content information, wherein the explanation content information comprises explanation content which matches the presentation content of the presentation terminal.

In some embodiments, the server may be a server established locally in a visiting place, or may be a server provided by a third party platform. In particular, when the explanation terminal is implemented by an APP or an in-app program in a mobile terminal such as a mobile phone, the server is a server provided or selected by the third-party platform which provides the APP or the in-app program.

It may be seen from the above embodiments that with the server according to the embodiments of the present disclosure, the terminal identifier of the presentation terminal which has established communication with the explanation terminal is received, to retrieve the explanation content information corresponding to the terminal identifier and return the explanation content information to the explanation terminal, so that the explanation terminal may automatically output the explanation content without users' any instruction operation on the explanation terminal, to achieve the effect of automatically explaining, to visitors, the presentation content of the presentation terminal where the visitors are currently located.

In some embodiments, the second transceiving module 601 is further configured to receive presentation content update information of the presentation terminal, wherein the presentation content update information comprises the terminal identifier of the presentation terminal and updated presentation content of the presentation terminal; and the processing module 602 is further configured to parse the presentation content update information, and update a matching relationship between the terminal identifier and the presentation content of the presentation terminal which is stored locally.

In some embodiments, the processing module 602 is further configured to:

count a number of explanation terminals which currently match each presentation terminal; and retrieve map information, invoke a path planning algorithm, and generate path planning information for each of the explanation terminals based on the number of the explanation terminals which currently match each presentation terminal; and the second transceiving module 601 is further configured to push the path planning information to the respective explanation terminals.

In some embodiments, the processing module 602 is further configured to:

count a number of explanation terminals which currently match each presentation terminal and time communication between the respective explanation terminals and each of the presentation terminals; and retrieve map information, invoke a path planning algorithm, and generate path planning information for each of the explanation terminals based on the number of the explanation terminals which currently match each presentation terminal and the duration of the communication between the respective explanation terminals and each of the presentation terminals; and the second transceiving module 601 is further configured to push the path planning information to the respective explanation terminals.

Figure 7:
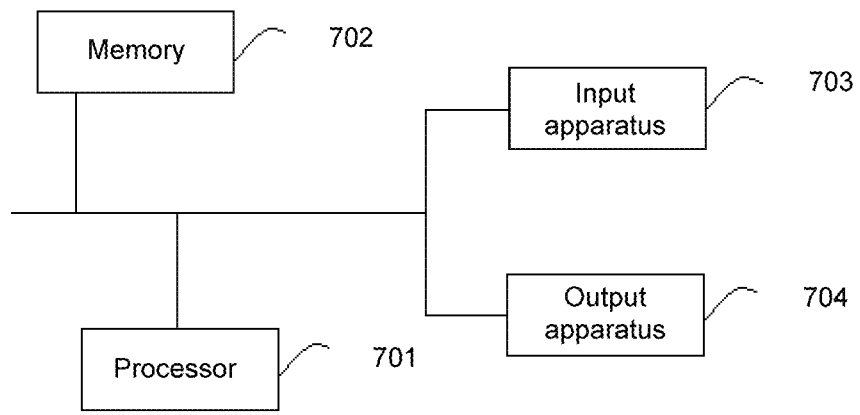
FIG. 7 is a schematic hardware structural diagram of another embodiment of an electronic device which performs the automatic explanation method according to the present disclosure.

Some other embodiments of the present disclosure propose an electronic device which may feed back a corresponding explanation content according to a presentation content of a presentation terminal. As shown in FIG. 7, illustrated is a schematic hardware structural diagram of another embodiment of an electronic device which performs the automatic explanation method according to the present disclosure.

As shown in FIG. 7, the apparatus comprises:

one or more processors 701 and a memory 702, and one processor 701 is taken as an example in FIG. 7.

The apparatus which performs the automatic explanation method may further comprise an input apparatus 703 and an output apparatus 704.

The processor 701, the memory 702, the input apparatus 703, and the output apparatus 704 may be connected through a bus or in other manners, and the connection through the bus is taken as an example in FIG. 7.

The memory 702, as a non-volatile computer-readable storage medium, may be used to store non-volatile software programs, non-volatile computer executable programs, and modules, for example, program instructions/modules (for example, the second transceiving module 601 and the processing module 602 shown in FIG. 6) corresponding to the automatic explanation method in the embodiment. The processor 701 executes various functional applications and data processing of the server, i.e., implementing the automatic explanation method according to the above method embodiment by running the non-volatile software programs, instructions, and modules stored in the memory 702.

The memory 702 may comprise a program storage area and a data storage area, wherein the program storage area may store an operating system and application programs required for at least one function; and the data storage area may store data created according to the use of the server etc. In addition, the memory 702 may comprise a high-speed random access memory, and may further comprise a non-volatile memory, for example, at least one magnetic disk storage device, a flash memory device, or other non-volatile solid-state storage devices. In some embodiments, the memory 702 may optionally comprise a memory remotely disposed with respect to the processor 701, and the remote memory may be connected to the server through a network. Examples of the above network comprise, but are not limited to, the Internet, an intranet, a local area network, a mobile communication network, and a combination thereof.

The input apparatus 703 may receive input numeric or character information, and generate a key signal input related to user settings and function control of the server. The output apparatus 704 may comprise a display device for example a display screen. In addition, the input apparatus 703 and/or the output apparatus 704 may also be, for example, a communicator for communication, such as a wireless communicator for radio frequency communication, Bluetooth communication, WiFi communication, RFID communication, NFC communication, WiMax communication, ZigBee communication, etc. and/or a wired communicator for Ethernet communication, fiber optic communication, xDSL communication, etc. In some embodiments, the server may comprise a third communicator which supports communication with the audio guide and the presentation terminal. In some embodiments, the third communicator may comprise at least one of a WiFi communication module, an NB-IoT communication module, and a radio frequency communication module (for example, 2G (for example, GSM, CDMA, etc.), 3G (for example, WCDMA, CDMA2000, TD-SCDAMA, etc.), 4G (for example, LTE, LTE-A, etc.), 5G (for example, NR) communication modules, etc.) In addition, the third communicator may further comprise a wired communication module, for example, an Ethernet communication module, a fiber optic communication module, an xDSL communication module etc. The server may communicate with the presentation terminal through the third communicator to acquire, for example, updated content of the presentation terminal, etc., and may communicate with the audio guide through the third communicator to receive, for example, the terminal identifier and/or return an explanation content, etc.

The one or more modules are stored in the memory 702, and when executed by the one or more processors 701, perform the automatic explanation method according to any of the method embodiments described above. The technical effect of the embodiment of the apparatus which performs the automatic explanation method is the same as or similar to that of any of the method embodiments described above.

Figure 8:
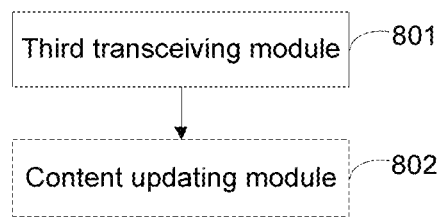
FIG. 8 is a schematic structural diagram of an embodiment of a presentation terminal according to the present disclosure.

Still some other embodiments of the present disclosure propose a presentation terminal, which may help an explanation terminal to acquire a corresponding explanation content according to a presentation content of a presentation terminal. As shown in FIG. 8, illustrated is a schematic flowchart of still another embodiment of an automatic explanation method according to the present disclosure.

The presentation terminal comprises:

a third transceiving module 801 configured to transmit a broadcast signal according to a first preset period, receive a matching request from the explanation terminal, establish communication with the explanation terminal and transmit a terminal identifier to the explanation terminal. In this embodiment, description is made by taking Bluetooth as an example. When the explanation terminal enters a Bluetooth broadcast coverage (the coverage depends on transmission power of a transmitter of a Bluetooth module, a receiving sensitivity of a receiver, and a loss of a communication link), a transceiving module in the explanation terminal receives a signal broadcast by the transmitter of the Bluetooth module, for example, reads a Bluetooth address, and finds a matched presentation terminal through the address.

In some embodiments, the presentation terminal may be a terminal for presenting content, which is provided in any public place or visiting place, the presentation content may be advertisements, paintings, or information related to the place, for example, an introduction, presentation of ruins etc., and all the contents which may be presented may be contents which may be presented by the presentation terminal.

In some embodiments, the presentation content of the presentation terminal may be changed, and the change may be physical change (for example, change of paintings) or informational change (for example, change of information contained in the presentation content). When the presentation content is informational content, the presentation terminal may be an electronic presentation board, an electronic screen, etc., and the content may be changed by changing display information. After the presentation content of the presentation terminal is changed, the presentation terminal needs to upload the updated presentation content together with its terminal identifier to a server for the server to update its related information which is locally stored.

In some embodiments, the presentation terminal further comprises a content updating module 802 configured to update the presentation content according to a second preset period, or receive an instruction to update the presentation content and update the presentation content The third transceiving module 801 is further configured to transmit the presentation content update information to the server, wherein the presentation content update information comprises the terminal identifier of the presentation terminal and the updated presentation content of the presentation terminal.

In some embodiments, in addition to the presentation content update manner disclosed in the above embodiments, other update manners may also be used. For example, a plurality of presentation contents are stored in the presentation terminal in advance, the presentation terminal may further have a sensing module provided thereon, and a user may enable the presentation content stored in the presentation terminal to switch in turn by means of touch or gesture in front of the presentation terminal.

Figure 9:
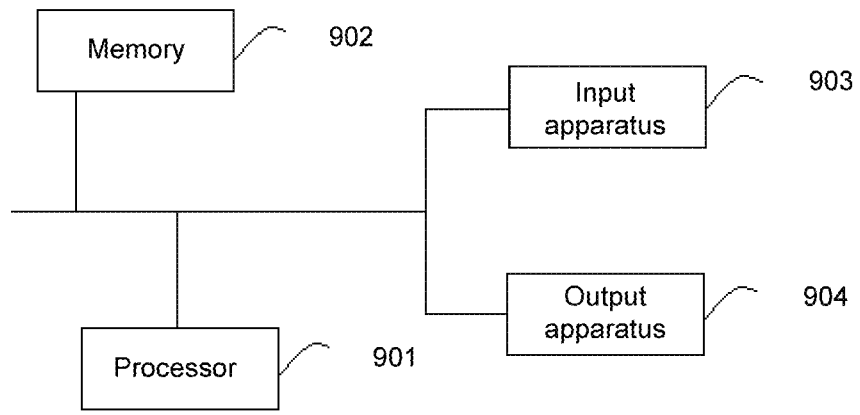
FIG. 9 is a schematic hardware structural diagram of yet another embodiment of an electronic device which performs the automatic explanation method according to the present disclosure.

Still some other embodiments of the present disclosure propose an electronic device which may help an explanation terminal to acquire a corresponding explanation content according to a presentation content of a presentation terminal. As shown in FIG. 9, illustrated is a schematic hardware structural diagram of still another embodiment of an electronic device which performs the automatic explanation method according to the present disclosure.

As shown in FIG. 9, the electronic device comprises:

one or more processors 901 and a memory 902, and one processor 901 is taken as an example in FIG. 9.

The apparatus which performs the automatic explanation method may further comprise an input apparatus 903 and an output apparatus 904.

The processor 901, the memory 902, the input apparatus 903, and the output apparatus 904 may be connected through a bus or in other manners, and the connection through the bus is taken as an example in FIG. 9.

The memory 902, as a non-volatile computer-readable storage medium, may be used to store non-volatile software programs, non-volatile computer executable programs, and modules, for example, program instructions/modules (for example, the third transceiving module 801 and the content updating module 802 shown in FIG. 8) corresponding to the automatic explanation method in the embodiment. The processor 901 executes various functional applications and data processing of the electronic device, i.e., implementing the automatic explanation method according to the above method embodiment by running the non-volatile software programs, instructions, and modules stored in the memory 902.

The memory 902 may comprise a program storage area and a data storage area, wherein the program storage area may store an operating system and application programs required for at least one function; and the data storage area may store data created according to the use of the presentation terminal etc. In addition, the memory 902 may comprise a high-speed random access memory, and may further comprise a non-volatile memory, for example, at least one magnetic disk storage device, a flash memory device, or other non-volatile solid-state storage devices. In some embodiments, the memory 902 may optionally comprise a memory remotely disposed with respect to the processor 901, and the remote memory may be connected to the electronic device through a network. Examples of the above network comprise, but are not limited to, the Internet, an intranet, a local area network, a mobile communication network, and a combination thereof.

The input apparatus 903 may receive input numeric or character information, and generate a key signal input related to user settings and function control of the presentation terminal. The output apparatus 904 may comprise a display device for example a display screen. In addition, the input apparatus 903 and/or the output apparatus 904 may also be, for example, a communicator for communication, such as a wireless communicator for radio frequency communication, Bluetooth communication, WiFi communication, RFID communication, NFC communication, WiMax communication, ZigBee communication, etc. and/or a wired communicator for Ethernet communication, fiber optic communication, xDSL communication, etc. In some embodiments, the presentation terminal may comprise multiple communicators which support different communication protocols or specifications. For example, the presentation terminal may comprise a fourth communicator and/or a fifth communicator, which support communication with the audio guide and the server respectively. In some embodiments, the fourth communicator may comprise at least one of a Bluetooth communication module, an NFC communication module, a RFID communication module, and a ZigBee communication module. In addition, in some embodiments, the fifth communicator may comprise at least one of a WiFi communication module, an NB-IoT communication module, and a radio frequency communication module (for example, 2G (for example, GSM, CDMA, etc.), 3G (for example, WCDMA, CDMA2000, TD-SCDAMA, etc.), 4G (for example, LTE, LTE-A, etc.), 5G (for example, NR) communication modules, etc.) In addition, the fifth communicator may further comprise a wired communication module, for example, an Ethernet communication module, a fiber optic communication module, an xDSL communication module etc. The presentation terminal may communicate with the audio guide through the fourth communicator to provide, for example, a terminal identifier of the presentation terminal, etc., and/or may communicate with the server through the fifth communicator to upload, for example, updated explanation content or receive an update instruction, etc.

The one or more modules are stored in the memory 902, and when executed by the one or more processors 901, perform the automatic explanation method according to any of the method embodiments described above. The technical effect of the embodiment of the apparatus which performs the automatic explanation method is the same as or similar to that of any of the method embodiments described above.

Figure 10:
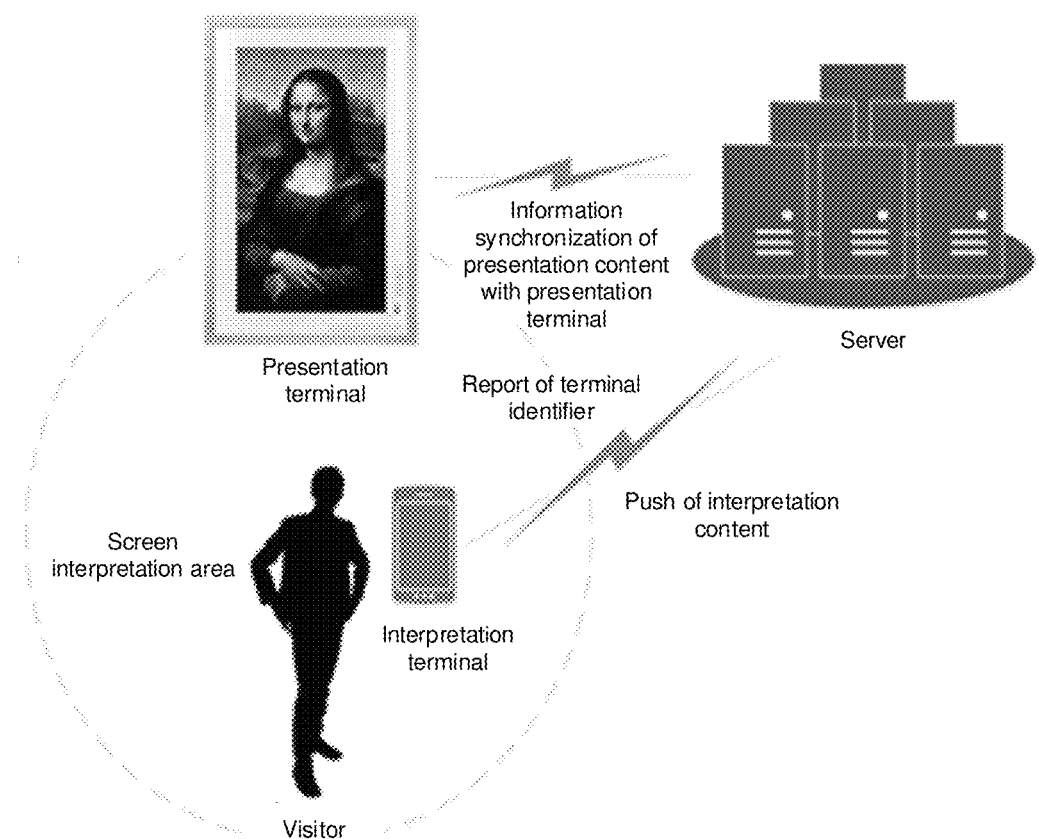
FIG. 10 is a schematic diagram of an automatic explanation system according to the present disclosure.

Some embodiments of the present disclosure propose an automatic explanation system, which may acquire a corresponding explanation content according to a presentation content of a presentation terminal. As shown in FIG. 10, illustrated is a schematic diagram of an automatic explanation system according to the present disclosure.

The automatic explanation system comprises any embodiment of the above explanation terminal, any embodiment of the above server, and any embodiment of the above presentation terminal.

It may be seen from the above embodiments that with the automatic explanation system according to the present disclosure, the terminal identifier of the presentation terminal with which the communication has been established is automatically acquired by the explanation terminal and is uploaded to the server, and thereby the explanation content is acquired from the server, so that the explanation terminal may automatically output the explanation content without users' any instruction operation on the explanation terminal, to achieve the effect of automatically explaining, to visitors, the presentation content of the presentation terminal where the visitors are currently located.

In addition, when the presentation content of the presentation terminal is updated, the updated content may be synchronized by the presentation terminal to the server, so that after communication between the explanation terminal and the presentation terminal is established, the corresponding explanation content after the presentation content is updated may be automatically acquired from the server according to the terminal identifier of the presentation terminal, so that the explanation content received by the explanation terminal may also change accordingly in a case of unfixed presentation content of the presentation terminal, so as to achieve accurate automatic explanation.

The embodiments of the present application provide a non-transitory computer storage medium having stored thereon computer-executable instructions, which may execute the processing method in any of the above method embodiments. The technical effect of the embodiment of the non-transitory computer storage medium is the same as or similar to that of any of the method embodiments described above.

Finally, it should be illustrated that it may be understood by those of ordinary skill in the art that all or a part of the flow in the method of the above embodiments may be implemented by a computer program instructing related hardware. The program may be stored in a computer-readable storage medium, and when executed, may comprise the flow of the embodiments of the methods described above. Here, the storage medium may be a magnetic disk, an optical disk, a Read-Only Memory (ROM), or a Random Access Memory (RAM) etc. The technical effect of the embodiment of the computer program is the same as or similar to that of any of the method embodiments described above.

In addition, the apparatus, device, etc. described in the present disclosure may typically be various electronic terminal devices, such as a mobile phone, a Personal Digital Assistant (PDA), a Portable Device (PAD), a smart TV, etc., or may also be large terminal devices, such as a server etc., and thus the protection scope of the present disclosure should not be limited to a particular type of apparatus or device. The client described in the present disclosure may be applied to any of the above electronic terminal devices in a form of electronic hardware, computer software, or a combination thereof.

Further, the method according to the present disclosure may also be implemented as a computer program executed by a CPU, which may be stored in a computer readable storage medium. The computer program, when executed by the CPU, executes the above functions defined in the method according to the present disclosure.

Further, the method steps and system units described above may also be implemented with a controller and a computer readable storage medium for storing a computer program which causes the controller to implement the steps or unit functions described above.

In addition, it should be understood that the computer readable storage medium (for example, a memory) described herein may be either a volatile memory or a nonvolatile memory, or may comprise both a volatile memory and a nonvolatile memory. By way of example and not limitation, the non-volatile memory may comprise a Read Only Memory (ROM), a Programmable ROM (PROM), an Electrically Programmable ROM (EPROM), an Electrically Erasable Programmable ROM (EEPROM), or a flash. The volatile memory may comprise a Random Access Memory (RAM), which may act as an external cache memory. By way of example and not limitation, the RAM may be obtained in a variety of forms, such as a Synchronous RAM (SRAM), a Dynamic RAM (DRAM), a Synchronous DRAM (SDRAM), a Double Data Rate SDRAM (DDR SDRAM), an Enhanced SDRAM (ESDRAM), a Synchronous Link DRAM (SLDRAM) and a Direct RambusRAM (DRRAM). The storage device according to the aspects disclosed is intended to comprise, but not limited to, these and other suitable types of memories.

It should also be understood by those skilled in the art that the various illustrative logical blocks, modules, circuits, and algorithm steps described in connection with the present disclosure herein may be implemented as electronic hardware, computer software, or a combination thereof. In order to clearly illustrate this interchangeability of hardware and software, functions of various illustrative components, blocks, modules, circuits, and steps have been generally described. Whether such functionality is implemented as software or as hardware depends on a particular application and design constraints imposed on the overall system. Those skilled in the art may implement the described functions in various ways for each specific application, but such implementation decisions should not be construed as causing a departure from the scope of the present disclosure.

The various exemplary logical blocks, modules, and circuits described in connection with the present disclosure herein may be implemented or executed with the following components designed to perform the functions described herein: general purpose processors, Digital Signal Processors (DSPs), Application Specific Integrated Circuits (ASICs), Field Programmable Gate Arrays (FPGAs) or other programmable logic devices, discrete gates or transistor logics, discrete hardware components, or any combination thereof. The general purpose processor may be a microprocessor, but alternatively, the processor may be any conventional processor, controller, microcontroller, or state machine. The processor may also be implemented as a combination of computing devices, for example, a combination of a DSP and a microprocessor, a plurality of microprocessors, one or more microprocessors in conjunction with a DSP core, or any other such configuration.

The steps of the method or algorithm described in connection with the present disclosure herein may be included directly in hardware, in a software module executed by a processor, or a combination thereof. The software module may reside in a RAM memory, a flash, a ROM memory, an EPROM memory, an EEPROM memory, a register, a hard disk, a removable disk, a CD-ROM, or any other form of storage medium known in the art. The exemplary storage medium is coupled to the processor, so that the processor may read information from the storage medium or write information to the storage medium. In an alternative solution, the storage medium may be integrated with the processor. The processor and the storage medium may reside in the ASIC. The ASIC may reside in the user terminal. In an alternative solution, the processor and the storage medium may reside as discrete components in the user terminal.

In one or more exemplary designs, the functions may be implemented in hardware, software, firmware, or any combination thereof. If implemented in software, the functions may be stored on a computer readable medium as one or more instructions or codes or transmitted through a computer readable medium as one or more instructions or codes. The computer readable medium comprises both a computer storage medium and a communication medium including any medium which facilitates transfer of a computer program from one location to another. The storage medium may be any available medium which may be accessed by a general purpose or special purpose computer. By way of example and not limitation, the computer readable medium may comprise a RAM, a ROM, an EEPROM, a CD-ROM or other optical disk storage device, disk storage device or other magnetic storage device, or any other medium which may be used for carrying or storing a required program code in a form of instructions or data structure and may be accessed by a general purpose or special purpose computer or a general purpose or special purpose processor. Also, any connection may be properly referred to as a computer readable medium. For example, if a coaxial cable, a fiber cable, a twisted pair, a Digital Subscriber Line (DSL), or wireless technology such as infrared, radio, and microwave is used to transmit software from a website, a server, or other remote source, the wired technology such as the coaxial cable, the fiber cable, the twisted pair, the DSL, or the wireless technology such as infrared, radio, and microwave are all included in the definition of media. As used herein, a magnetic disk and an optical disk comprise a Compact Disk (CD), a laser disk, an optical disk, a Digital Versatile Disk (DVD), a floppy disk, and a Blu-ray disk, in which the magnetic disk generally reproduces data magnetically, and the optical disk optically reproduces data using a laser. Combinations of the above content should also be included within the scope of the computer readable media.

The exemplary embodiments have been disclosed above, but it should be illustrated that there may be a plurality of changes and amendments without departing from the scope of the present disclosure as defined by the claims. The functions, steps and/or actions of the method claims according to the embodiments disclosed herein are not required to be performed in any particular order. In addition, although elements of the present disclosure may be described or claimed in an individual form, a plurality of elements may be conceived unless explicitly limited to a singular form.

It should be understood that as used herein, the singular forms "a", "an", "the" are intended to comprise a plural form unless the context clearly supports exceptions. It should also be understood that "and/or" as used herein is intended to comprise any and all possible combinations of one or more of the associated items listed.

The above serial numbers of the embodiments of the present disclosure are merely for the description, and do not represent advantages and disadvantages of the embodiments.

It may be understood by those of ordinary skill in the art that all or a part of the steps of implementing the above embodiments may be completed by hardware, or may also be completed by a program instructing related hardware, and the program may be stored in a computer readable storage medium. The above storage medium may be a read only memory, a magnetic disk or an optical disk etc.

It should be understood by those of ordinary skill in the art that the discussion of any of the above embodiments is merely exemplary, and is not intended to imply that the scope of the present disclosure (including the claims) is limited to these examples. Under the concept of the embodiments of the present disclosure, the technical features in the above embodiments or in the different embodiments may also be combined, there are many other variations of the various aspects of the embodiments of the present disclosure as described above, and details thereof are not provided for the sake of brevity. Therefore, any omissions, modifications, equivalent substitutions, improvements, etc. which are made within the spirit and scope of the embodiments of the present disclosure are intended to be included within the protection scope of the embodiments of the present disclosure.

I claim:

1. An automatic explanation method implemented by an explanation terminal, the method comprising:
    establishing communication with a presentation terminal and acquiring a terminal identifier of the presentation terminal; and
    uploading the terminal identifier to a server and receiving returned explanation content information comprising an explanation content which matches a presentation content of the presentation terminal,
    wherein the step of establishing communication with the presentation terminal comprises:
    receiving broadcast signals transmitted by one or more presentation terminals;
    determining a number of the received broadcast signals;
    wherein if there is more than one broadcast signal;
    establishing communication with a corresponding presentation terminal if there is one broadcast signal;
    determining a difference between signal strength of first two broadcast signals in a descending signal strength order if there are two or more broadcast signals;
    establishing communication with a presentation terminal having the highest signal strength if the difference is greater than or equal to a difference threshold;
    determining whether the signal strength of the broadcast signal having the highest strength satisfies a second strength threshold if the difference is less than the difference threshold; and
    establishing communication with the presentation terminal if the signal strength of the broadcast signal having the highest strength satisfies a second strength threshold.

2. The method according to claim 1, wherein if the signal strength of the broadcast signal does not satisfy the second strength threshold, the signal strength of the broadcast signal is repeatedly compared with the second strength threshold at a predetermined time interval until the broadcast signal satisfies the second strength threshold, and corresponding communication is established.

3. The method according to claim 1, wherein after establishing communication with the presentation terminal, the method further comprises:
    timing the communication;
    outputting the explanation content if duration of the communication exceeds a first duration threshold and the communication is not disconnected; and
    outputting no explanation content and resetting the duration if the duration of the communication does not exceed the first duration threshold and the communication is disconnected.

4. The method according to claim 3, further comprising:
    determining whether the duration of the communication exceeds a second duration threshold greater than the first duration threshold; and
    outputting timeout reminder information if the duration of the communication exceeds the second duration threshold.

5. The method according to claim 1, further comprising:
    receiving path planning information returned by the server; and
    outputting navigation content according to the path planning information.

6. The method according to claim 1, wherein the explanation content is changeable according to the presentation content.

7. The method according to claim 1, wherein the explanation content comprises at least one of a text content, a voice content, an image content, a video content, coupons, discount cards, and products.

8. The method according to claim 1, further comprising:
    outputting the explanation content by means of one or more of voice playback, text display, and image display.

9. An automatic explanation method implemented by a server, the method comprising:
    receiving a terminal identifier of a presentation terminal;
    determining a presentation content of the presentation terminal corresponding to the terminal identifier;
    determining explanation content information which matches the presentation content; and
    returning the explanation content information,
    wherein the method further comprises:
    counting a number of explanation terminals which currently match each of presentation terminals;
    retrieving map information, invoking a path planning algorithm, and generating path planning information for each of the explanation terminals based on the number of the explanation terminals which currently match each presentation terminal; and
    pushing the path planning information to the respective explanation terminals.

10. The method according to claim 9, further comprising:
    receiving presentation content update information of the presentation terminal, wherein the presentation content update information comprises the terminal identifier of the presentation terminal and an updated presentation content of the presentation terminal; and
    parsing the presentation content update information, and updating a matching relationship between the terminal identifier and the presentation content of the presentation terminal which is stored locally.

11. The method according to claim 9, further comprising:
counting a number of explanation terminals which currently match each of presentation terminals and duration of communication between each of the explanation terminals and each of presentation terminals;
retrieving map information, invoking a path planning algorithm, and generating path planning information for each of the explanation terminals based on the number of the explanation terminals which currently match each of presentation terminals and the duration of the communication between each of the explanation terminals and each of presentation terminals; and
pushing the path planning information to the respective explanation terminals.

12. An explanation terminal, comprising:
at least one processor; and
a memory communicatively connected to the at least one processor,
wherein
the memory has stored thereon instructions executable by the at least one processor, wherein the instructions, when executed by the at least one processor, enable the at least one processor to perform the method of claim 1.

13. A server, comprising:
at least one processor; and
a memory communicatively connected to the at least one processor, wherein
the memory has stored thereon instructions executable by the at least one processor, wherein the instructions, when executed by the at least one processor, enable the at least one processor to perform the method of claim 9.

14. An automatic explanation system, comprising:
the explanation terminal according to claim 12;
a server comprising:
at least one processor; and
a memory communicatively connected to the at least one processor, wherein
the memory has stored thereon instructions executable by the at least one processor, wherein the instructions, when executed by the at least one processor, enable the at least one processor to:
receive a terminal identifier of a presentation terminal;
determine a presentation content of the presentation terminal corresponding to the terminal identifier;
determine explanation content information which matches the presentation content; and
return the explanation content information; and
a presentation terminal comprising:
at least one processor; and
a memory communicatively connected to the at least one processor, wherein
the memory has stored thereon instructions executable by the at least one processor, wherein the instructions, when executed by the at least one processor, enable the at least one processor to:
transmit a broadcast signal according to a first preset period;
receive a matching request from an explanation terminal; and
establish communication with the explanation terminal and transmit a terminal identifier to the explanation terminal.

* * * * *